United States Patent [19]

Walter et al.

[11] Patent Number: 4,523,864
[45] Date of Patent: Jun. 18, 1985

[54] TANDEM BEARING CONSTRUCTION

[75] Inventors: Jerry D. Walter, North Palm Beach, Fla.; Claude R. Stogner, Huntsville, Ala.

[73] Assignee: United Technologies Corporation, Hartford, Conn.

[21] Appl. No.: 604,755

[22] Filed: Apr. 27, 1984

[51] Int. Cl.³ .................. F16C 19/10; F16C 33/58
[52] U.S. Cl. .................................. 384/613; 384/513; 384/517
[58] Field of Search .............. 308/189 R, 189 A, 219; 384/490, 504, 513, 514, 517, 519, 613, 615, 616, 564, 609

[56] References Cited

U.S. PATENT DOCUMENTS 2,195,795  4/1940  Baker ..................... 384/564
4,425,010  1/1984  Bryant et al. ........... 384/613

FOREIGN PATENT DOCUMENTS 593276  2/1960  Canada ..................... 384/609

Primary Examiner—Stuart S. Levy
Assistant Examiner—Thomas Hannon
Attorney, Agent, or Firm—Norman Friedland

[57] ABSTRACT

The thrust loads imposed on tandem ball bearings are equalized by incorporating teeter-totters on either side of the outer races that engage the ends of the outer races and a slidably mounted concentric carrier.

4 Claims, 3 Drawing Figures

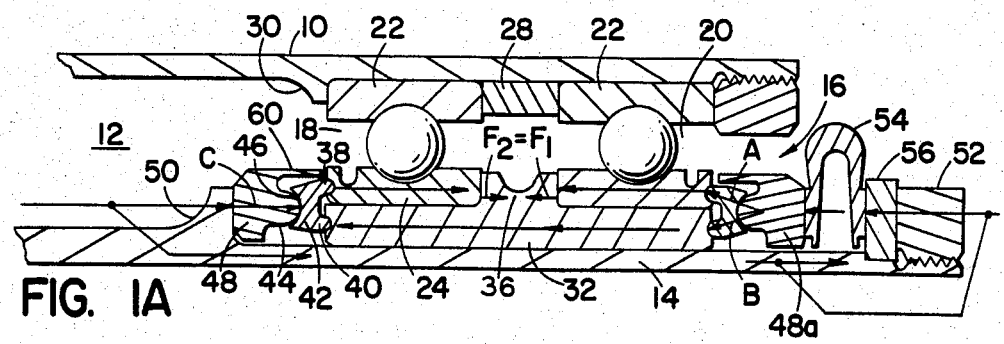
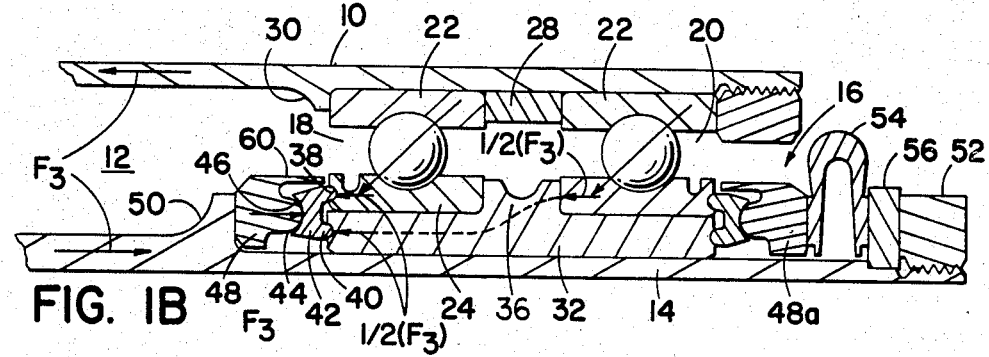
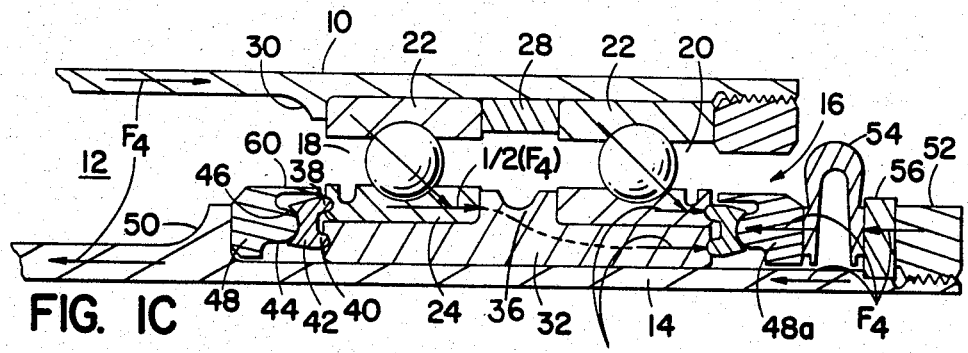

TANDEM BEARING CONSTRUCTION

DESCRIPTION

1. Technical Field

This invention relates to ball bearings designed for thrust loads and particularly to means for equalizing the loads imposed on such bearings when mounted in side-by-side or tandem relationship.

2. Background Art

Tandem mounted thrust bearings are becoming increasingly important because they allow rotating machinery to accommodate higher thrust loads at significantly increased shaft speeds and smaller bearing diameters. However, one of the major obstacles that persists in heretofore known tandem bearing designs is that in order to achieve a satisfactory balance of the distribution of the load to each of the bearings, one must accommodate these load splits over the entire operating envelope of the rotary shaft. Particularly in aircraft engine applications this envelope not only includes the typical static preload and operating load problems, it must also withstand the thermal conditions of the engine's hostile environment.

We have found that we can alleviate the problems noted above by mounting the bearings in a carrier slidably mounted into the support housing which engages at either end a load equalizer formed in a teeter-totter like manner having pivotal contact points on the outer races of the bearing and the opposing end surfaces of the carrier. The opposing end of the teeter-totter like member pivots about a fixed load transmitting member which in turn transmits the thrust loads to ground. By virtue of this invention the load can be distributed to each bearing to achieve a predetermined split, the system can comply with both the thermal and load requirements with a minimal deflection and stress change than would be otherwise present in a single bearing assembly and assures positional constraint to the support housing under all the load conditions.

DISCLOSURE OF INVENTION

An object of this invention is to provide for a rotating mechanism subjected to thrust loads, a load splitting mechanism for a pair of side-by-side mounted thrust bearings. A feature of this mounting is to include teeter-tottering load equalizing segmented-ring elements mounted on either end of a bearing carrier that engages the outer race of each bearing, the carrier and the load absorbing members in such a manner that it translates the carrier until the loads are balanced between the two bearings.

Other features and advantages will be apparent from the specification and claims and from the accompanying drawings which illustrate an embodiment of the invention.

BRIEF DESCRIPTION OF DRAWINGS

FIGS. 1A, 1B and 1C are identical sectional views showing a partial assembly of a rotating shaft supported by tandem mounted ball bearings employing this invention, where each Fig. depicts the forces for given operating conditions.

BEST MODE FOR CARRYING OUT THE INVENTION

While this invention contemplates in its preferred embodiment usage as an aircraft gas turbine engine it is to be understood that it has utility for other rotating machinery, such as gearboxes and the like. However, it will be appreciated that in the interest of saving cost and weight in a gas turbine power plant it is desirable to make the engine from smaller components necessitating the need to increase the rotating shaft speed to achieve the same power output. This necessitates new advances in bearing technology to compensate for these high thrust load conditions.

As was noted above, the purpose of this mechanical system is to balance the thrust load between the two mounted ball bearings. In this instance, as will be more fully explained herein below, by fabricating the opposing load equalizers symmetrically the loads will substantially be split 50—50. However, by changing the dimensions on the pivoting legs of the teeter-totter the split can be made to any given ratio.

The invention can best be understood by referring to FIGS. 1A–1C which shows a rotary shaft 10 supported in the bore 12 of housing 14 and supported thereby by the tandem mounted ball bearing system generally indicated by reference numeral 16. Although not shown the shaft 10 supports the turbine and compressor of a twin spool gas turbine power plant for powering aircraft and the shaft as is typical in such installations is subjected to thrust loads in either direction, depending on the loadings on the turbine and compressor as well as whether the engine is in its normal flight mode or thrust reversing. It is generally accepted in this airborne environment the bearings are preloaded by approximately 700 pound force which is generally used as the minimum value to prevent skidding and is capable to withstand substantially a 2000 pound outer limit.

Inasmuch as ball bearings 18 and 20 are identical like-reference numerals will be used to refer to identical parts. It is to be appreciated that suitable ball bearings can be commercially available assemblies. Suffice it to say that each include inner race 22 and outer race 24 sandwiching a plurality of balls (one in each row being shown).

The spacer ring 28 separates the pair of bearings and is precisely dimensioned to assure the axis of the bearing is in a given location. The bearing is urged against shoulder 30 formed integral with shaft 10 and extending radially outward from the centerline. A suitable spanner nut torqued to the required value locks the assembly to the shaft. This construction is generally well-known.

According to this invention the outer races 24 are mounted into recesses formed in carrier 32 which likewise carries spacer 36 serving the identical function as spacer 28. The opposing ends of carrier 32 and outer races 24 are grooved to accommodate the pivoted contact points formed in the legs 38 and 40 of the load equalizer (teeter-totter) 42. The load equalizer is preferably formed in circumferential segments. As noted each teeter-totter 42 is suitably contoured at the opposite end 44 from the legs to accommodate a rounded surface 46 extending axially inwardly from the load ring 48. Load ring 48 preferably is a full hoop. This assembly is stacked in the inner diameter of housing 14 between shoulder 50 and spanner nut 52. A suitable spring 54 and retainer 56 are mounted between spanner nut 52 and load ring 48A and is likewise torqued to achieve the proper preload. However, carrier 32 is loosely fitted into housing 14 so that it is capable of sliding relative to the axis of the balls of the bearing. To best appreciate this operation of the load splitting capabilities of this invention, consideration will be given to FIGS. 1A. 1B and 1C illustrating the force diagram of (1) the preload condition, (2) forward thrust condition and (3) aft thrust condition.

As will be apparent from FIG. 1A the torquing of spanner nut 52 causes spring 54 to impose a load to both the outer race and carrier through each of the legs of the teeter-totter shown by arrows A and B. This is reacted by the load against the casing shown by arrow C. These loads pass through the legs of the outer teeter-totter which pivots until the forces on each bearing are substantially the same and the carrier will inherently position itself until this occurs.

Similarly, when the loads are in the forward thrust condition shown in FIG. 1B the teeter-totter will rotate and position the carrier until the loads are split between each ball bearing and as shown in FIG. 1C, the reverse holds true for an aft thrust condition.

As was noted above by dimensioning the legs symmetrically about the axis of the load equalizer 48, the loads will be split substantially 50/50 between bearings. By changing the dimension ratio of both legs of the load equalizer the split relationship can likewise be changed. As the load equalizer is made into a segmented ring to minimize tolerances and differences in load and thermal deflection. A cover 60 may be provided to contain these segments during assembly to assure that there is proper alignment of these components.

It should be understood that the invention is not limited to the particular embodiments shown and described herein, but that various changes and modifications may be made without departing from the spirit and scope of this novel concept as defined by the following claims.

I claim:

1. Means for equalizing the load on tandemly mounted ball bearings supporting a shaft in a housing, each of the ball bearings including an inner race, an outer race and a plurality of balls mounted therebetween, means for locking said tandemly mounted bearings in axially spaced relationship to said shaft, said equalizing means including a concentrically mounted carrier disposed between said housing and said outer races, a pair of load equalizers mounted at the ends of said carrier and said outer races each having a pair of legs engaging the ends of the carrier and the ends of the outer races, a pair of pivoted members engaging the load equalizers at the opposite end of said legs and equal distance therefrom said legs being pivoted in response to thrust loads imposed on said bearing to transmit the loads in a predetermined proportion to said carrier and said outer races, the carrier being in sliding relation with said housing so that the thrust load is equalized in both the forward and reverse directions.

2. A pair of tandemly mounted bearings supporting a common shaft in a housing, each of said bearings including an inner race, an outer race and a plurality of ball bearings supported therebetween, means for locking said tandem bearings in fixed position relative to said shaft and in axially spaced position relative to each other, and means locking said tandem bearings into said housing so as to have finite moveable positions, said housing locking means including a cylindrically shaped carrier member concentric to and surrounding the outer races of each of said tandem bearings and having inwardly projecting shoulders normal to and adjacent each of the outer races disposed in sliding relationship relative to said housing, a pair of ring elements surrounding said shaft axially spaced from the outer races and having generally spherically shaped projections in axial alignment, a pair of segmented ring-like elements spaced between said spherically shaped projections and the end of each of said outer races and the opposing ends of said cylindrical shaped carrier member, axially projecting elements carried on each of said pair of segmented ring-like elements having working surfaces in contact with the ends of said carrier and said outer races and having opposing concave working surfaces engaging each of said spherically shaped projections for transmitting the loads in a predetermined proportion to said carrier and said outer race by pivoting about said spherical shaped projections whereby the loads carried by said pair of tandemly mounted bearings are equalized in the said predetermined proportions.

3. A pair of tandemly mounted bearings as in claim 2, including a locking nut at the axial end of said bearing secured to said housing and a spring disposed axially between said locking nut and one of said pair of ring elements.

4. A pair of tandemly mounted bearings as in claim 3 wherein the ends of said outer race and the carrier are recessed to compliment the working surfaces of said axially projection elements.

* * * * *